United States Patent Office 3,809,717
Patented May 7, 1974

3,809,717
SULFONATED PHENOL ETHERS
Manfred Daeuble, Frankenthal, and Norbert Greif and Rolf Fikentscher, Ludwigshafen, Germany, assignors to Badische Anilin- & Soda-Fabrik Aktiengesellschaft, Ludwigshafen (Rhine), Germany
No Drawing. Filed Mar. 29, 1972, Ser. No. 239,382
Int. Cl. C07c *143/42*
U.S. Cl. 260—512 R       5 Claims

ABSTRACT OF THE DISCLOSURE

Sulfonated phenol ethers and a process for their production by reaction of sulfonated phenols with alkylene oxides.

---

The invention relates to sulfonated phenol ethers, a process for their production and their use as dyeing assistants for dyeing synthetic polyamide fibers with acid dyes.

The prior art oxyalkylation of phenols without a solvent or in an inert organic solvent such as dioxane at temperatures of from 100° to 150° C. with an alkali metal alcoholate as catalyst cannot be carried out in the case of sulfonated alkylphenols.

It is an object of the invention to provide a number of new sulfonated phenol ethers.

Another object is a new process for their production.

Yet another object is their use as valuable dyeing auxiliaries for dyeing synthetic polyamide fibers.

The new compounds conform to the Formula I:

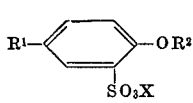

in which:

$R^1$ is alkyl of eight to fourteen carbon atoms,
$R^2$ is 2 - hydroxyethyl which may bear methyl, ethyl, methylol or phenyl as a substituent and
X is hydrogen, alkali metal, ammonium or substituted ammonium.

Compounds of the Formula I in which $R^2$ is

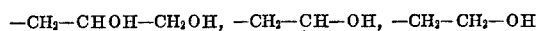

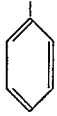

or

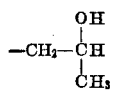

are preferred.

We have found that the compounds of the Formula I are obtained when a sulfonated alkylphenol or a mixture of alkylphenols of the Formula II:

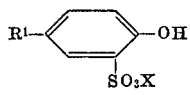

in which $R^1$ and X have the same meanings as in Formula I is reacted in the presence of an aqueous alkali with ethylene oxide or an ethylene oxide which bears a methyl, ethyl, phenyl or chloromethyl group as a substituent, the aqueous alkali having a meaning corresponding to the symbol X.

The unexpected feature in this reaction is the use of water as solvent because under the strongly alkaline conditions the known epoxides are normally immediately hydrolyzed into the corresponding dialcohols with water. In the present case the hydrolysis as a secondary reaction is much slower than the main reaction according to the invention. Moreover it is possible when using water to obtain considerably paler and purer products at a reaction temperature which is 50° C. lower than in the prior art methods. In spite of the considerably shorter reaction periods, the yields are more than 80% and in the most favorable cases may reach 95%.

Starting products for the process according to the invention are alkylphenols in which the alkyl radical is in para-position to the hydroxyl group. Alkylphenols in which the alkyl radical has eight to fourteen, preferably ten to fourteen, carbon atoms are suitable. Alkylphenols are also of industrial importance which are obtained by reaction of phenol with $C_{11}$ to $C_{14}$ olefin cuts obtained in the fractional distillation of olefins. These are hereinafter referred to for short as $C_{11}/C_{14}H_{23}/H_{29}$ alkylphenols.

These alkylphenols, alone or mixed together, are reacted with sulfonating agents. These may conveniently be sulfuric acid, oleum, sulfur trioxide and preferably chlorosulfonic acid.

Another starting product is ethylene oxide or an ethylene oxide bearing a group according to the above definition as a substituent. Examples of these are ethylene oxide, 1,2-propylene oxide, 1,2-butylene oxide, styrene oxide and epichlorohydrin.

Epichlorohydrin and propylene oxide are of particular industrial interest. In the reaction with these epoxides there are formed glycerol ethers or hydroxypropyl ethers which have particularly favorable properties as regards their use as dyeing assistants in the dyeing of synthetic polyamides with acid dyes.

The alkaline reagents used in aqueous solution which are required for the reaction may be any alkaline reacting agent known in the literature. Examples are mineral alkalies such as caustic soda solution or caustic potash solution, but organic alkaline reacting compounds such as amines and alkanolamines and also ammonia are also suitable. It is preferred to use caustic soda solution or triethanolamine as the reaction medium.

The reaction may for example be carried out as follows:
The reactants are preferably reacted in equivalent amounts and the procedure may be that one of the alkylphenols as defined above or a mixture of the same is reacted with one of the said sulfonating agents. Water is then added to the reaction mixture, preferably without further purification (the sulfonation is generally carried out in an anhydrous medium). Then about 1.1 times to twice the molar amount of alkaline reacting agent is added. At temperatures of from 70° to 100° C., preferably from 75° to 85° C., the epoxide is added preferably in about the molar to twice the molar amount and the reaction solution is left for about half an hour to two hours at the said temperature, the reaction mixture advantageously being kept in vigorous movement. The whole is then made neutral with an acid such as hydrochloric acid (X then being hydrogen) or is mixed with about the same amount of an organic solvent in order in this way to separate the reaction product from the aqueous salt solution. The organic phase is evaporated to dryness at subatmospheric pressure. The residue is taken up in such an amount of water that an about 30 to 50%, preferably a 40%, solution is formed.

Products according to the invention are suitable in an outstanding way as dyeing auxiliaries in the dyeing of synthetic polyamide fibers with acid dyes.

They are distinguished especially by their wetting and levelling effect and may be added to the dye liquors in very low concentrations (about 0.1 to 1 g. per liter).

The procedure when they are used as dyeing assistants is that generally 1 part of the product according to the invention is added to about 200 to 10,000, preferably 500 to 5000, parts of water in the range of temperatures from 50° to 130° C., this is adjusted to a pH of from 3.5 to 7 in the conventional manner with a buffer substance and an acid component, preferably acetic acid, and dyeing is carried out in this liquor. Level dyeings which do not exhibit streakiness are obtained.

All dyes such as are known for this purpose in the literature, for example monoazo or disazo compounds containing one or two sulfonic groups, anthraquinone and quinoline derivatives, and metal complex dyes having one or two dye molecules per mole of complex-forming metal atom so that the finished dye has one or two sulfonic groups are suitable as acid dyes.

In addition to the said auxiliaries according to the invention other agents having affinity for the dye, for example oxyethylated alkylamines and defoamers, for example fatty acid esters of oxyethylated polypropylene glycols. It is particularly advantageous to prepare from these components a mixture which has a particularly good levelling power for dyes and moreover gives non-foaming liquors.

In the following examples, which illustrate but do not limit the invention, the parts specified are parts by weight unless expressly stated otherwise. In this case parts by volume bear the same relation to parts by weight as the liter to the kilogram.

EXAMPLE 1

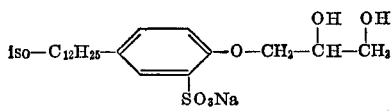

116.5 parts (1 molar equivalent) of chlorosulfonic acid is added to 262 parts (1 molar equivalent) of dodecylphenol in 70 parts by volume of 1,2-dichloropropane at 5° to 10° C. and the whole is then stirred for from five to ten hours. The reaction mixture is stirred with 80 parts (2 moles) of NaOH in 500 parts by volume of water. 83.5 parts (0.9 molar equivalent) of epichlorohydrin is dripped in at 85° C. and the whole stirred for another half hour to two hours at the same temperature. The reaction mixture is made neutral with 2 to 5 parts by volume of $HCl_c$ and stirred with 300 parts by volume of 1,2-dichloropropane. The organic phase is separated and evaporated to dryness in vacuo. The residue is taken up in such an amount of water that a 40% solution is formed, which is decanted.

EXAMPLE 2

Production of:

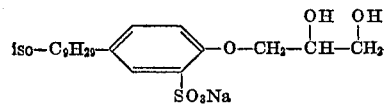

116.5 parts (1 molar equivalent) of chlorosulfonic acid is dripped at 20° to 25° C. into 220 parts (1 molar equivalent) of nonylphenol, the temperature thus rising to 35° to 37° C. The reaction mixture is stirred for one hour and then 80 parts (2 molar equivalents) of NaOH in 500 parts by volume of water is added. 92.4 parts (1 molar equivalent) of epichlorohydrin is dripped in at 90° to 100° C. and the whole is stirred for another hour at the same temperature. The reaction product is separated with 500 parts by volume of ethylene chloride as an organic phase and evaporated to dryness in vacuo.

EXAMPLE 3

Production of:

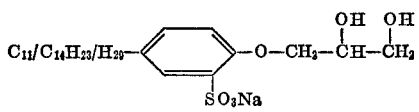

116.5 parts (1 molar equivalent) of chlorosulfonic acid is added at 15° to 20° C. to 269 parts (1 molar equivalent) of

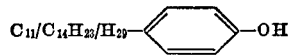

in 80 parts by volume of ethylene chloride, and the whole is stirred for another three to four hours at room temperature. The reaction mixture is stirred with 80 parts (2 molar equivalents) of NaOH in 800 parts by volume of water. 83.3 parts (0.9 molar equivalent) of epichlorohydrin is dripped in at 70° to 80° C. and the whole stirred for another hour at the same temperature. The product, obtained as an oil, is taken up in 400 parts by volume of ethylene chloride, and the organic phase is separated and evaporated to dryness.

EXAMPLE 4

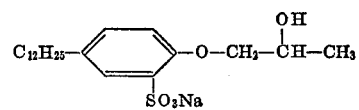

116.5 parts of chlorosulfonic acid is added to 262 parts of dodecylphenol in 100 parts by volume of ethylene chloride at 5° to 10° C. and the whole is stirred for another five to ten hours at room temperature. The sulfonation mixture is added to a solution of 48 parts of NaOH in 500 parts by volume of water. 87 parts of propylene oxide is dripped in at 65° to 75° C. and the whole is stirred for another one hour to two hours at 80° C.

The reaction product is taken up in 300 parts by volume of ethylene chloride, separated and freed from solvent in vacuo.

EXAMPLE 5

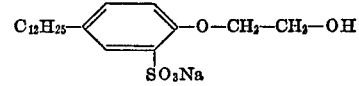

364 parts of dodecylphenol sulfonate and 8 parts of NaOH are reacted in 500 parts by volume of water in an autoclave at 80° to 85° C. with 88 parts of ethylene oxide over two to three hours. The reaction product is taken up in 400 parts by volume of ethylene chloride, separated and concentrated in vacuo.

EXAMPLE 6

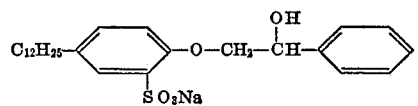

60 parts of styrene oxide is dripped into 182 parts of dodecylphenol sulfonate and 40 parts of NaOH in 260 parts by volume of water at 85° C. and the whole is stirred for another hour at 90° C. The reaction mixture is neutralized with dilute hydrochloric acid and then 200 parts by volume of butanol is added. The organic phase is separated, dried with $Na_2SO_4$ and evaporated to dryness.

EXAMPLE 7

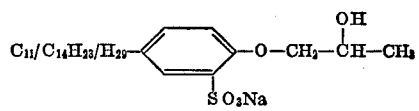

175 parts of $C_{11}/C_{14}$ α-olefins are added to 282 parts of phenol and 5.5 parts of boron fluoride ethanol over one hour at 65° C. and the whole is stirred for another six to twelve hours at 65° C. Excess phenol is distilled off in vacuo (20 mm.). 116.5 parts of chlorosulfonic acid is added to the residue at 0° to 5° C. and the whole is stirred for another five to ten hours at room temperature. The reaction mixture is taken up in 600 parts by volume of water, neutralized with 83.5 parts of 50% caustic soda solution and another 8 parts of 50% caustic soda solution is added. 116 parts of propylene oxide is dripped in at 85° C. and then the whole is stirred for another thirty to sixty minutes. After cooling, the solution is neutralized with dilute hydrochloric acid and can be decanted.

EXAMPLE 8

1 part of monoglycerol ether of sodium dodecylphenol sulfonate, 6 parts of sodium acetate and 3 parts of 60% acetic acid are added to 3000 parts of water at 50° C. and 100 parts of knitted goods of texturized nylon 6,6 fibers is allowed to remain in this liquor for ten minutes. Then 0.5 part of Acid Yellow 25 and 0.2 part of Acid Blue 72 are added, the whole is heated to boiling temperature in thirty minutes and dyeing is continued for about one hour at the boiling temperature. A level green dyeing is obtained which does not exhibit any streakiness.

EXAMPLE 9

0.5 part of the monoglycerol ether of the sodium salt of 4-nonylphenol-2-sulfonic acid, 1.6 parts of acetic acid (60%), 2.4 parts of sodium sulfate, 1 part of Acid Red 151, 0.5 part of Acid Red 42 and 100 parts of tufted carpet material whose pile consists of texturized nylon 6 fibers are added to 2000 parts of water at 50° C. in a winch dyeing machine. The liquor is heated over forty-five minutes to boiling temperature, boiled for ninety minutes and then rinsed thoroughly.

After drying, a very bright red dyeing is obtained which exhibits very good levelness and fastness to light.

EXAMPLE 10

1 part of the monoglycerol ether of the sodium salt of 4-$C_{11}$/$C_{14}$-alkylphenol-2-sulfonic acid, 2 parts of monosodium phosphate and 0.2 part of Acid Blue 72 and also 100 parts of textured nylon 6,6 yarn are added to 1000 parts of water in a cheese dyeing machine at 60° C. and heated over thirty minutes to boiling point. After boiling for one hour, the whole is cooled, rinsed and dried.

Pale blue dyed yarn is obtained which after knitting gives a material of excellent levelness.

EXAMPLE 11

1 part of the monoglycerol ether of the triethanolamine salt of 4-dodecylphenol-2-sulfonic acid, 0.5 part of the adduct of 10 moles of ethylene oxide to oleylamine, 2.5 parts of 60% acetic acid, 3.5 parts of sodium acetate, 0.5 part of Acid Yellow 19 and 0.3 part of Acid Blue 266 together with 100 parts of knitted goods of nylon 6,6 filament fibers are added at 60° C. to 3000 parts of water in a winch dyeing machine. The whole is heated over forty-five minutes to boiling temperature and dyed for ninety minutes at this temperature.

A green dyeing of excellent levelness is obtained which does not exhibit any streakiness.

EXAMPLE 12

1 part of the sodium salt of the monopropylene glycol ether of p-dodecylphenol-2-sulfonic acid, 4 parts of sodium acetate and 6 parts of 30% acetic acid are added to 3000 parts of water at 60° C. and 100 parts of knitted goods of textured nylon 6,6 fibers is allowed to remain therein for ten minutes. Then 1 part of Acid Yellow 25 and 0.5 part of Acid Blue 72 is added, the temperature of the liquor is brought over thirty minutes to boiling point and dyeing is continued for one hour at the boil. An absolutely level dyed material devoid of streakiness is obtained.

EXAMPLE 13

2 parts of the sodium salt of the monopropylene glycol ether of p-$C_{11}$/$C_{14}$-n-alkylphenol-2-sulfonic acid, 1 part of the adduct of 12 moles of ethylene oxide to oleylamine, 3 parts of sodium acetate and 2 parts of 30% acetic acid are placed in 1000 parts of water at 60° C. in a beam dyeing machine and charmeuse of nylon 6 yarn is placed therein for ten minutes at 60° C. 0.3 part of C.I. Acid Red 42 and 1 part of Acid Red 151 are then added, the whole heated within thirty minutes to boiling temperature and dyed for one hour at this temperature. The dye liquor is constantly pumped from inside to outside.

After rinsing and drying a full neutral red dyeing of high grade levelness and lightfastness is obtained.

EXAMPLE 14

1 part of the sodium salt of the monoethylene glycol ether of p-dodecylphenol-2-sulfonic acid, 1 part of the adduct of 12 moles of ethylene oxide to oleylamine and 1 part of the stearic bis-ester of the adduct of 25 moles of ethylene oxide to a polypropylene glycol of the molecular weight 2500, this auxiliary having been previously stirred separately with 5 parts of water to form a stable mixture clearly soluble in water, are added to 2000 parts of water at 60° C. in a high temperature winch dyeing machine.

Into the said liquor 100 parts of knitted goods of textured nylon 6,6 fiber yarn is placed for ten minutes and then 1.5 parts of the dye C.I. 18762 is added. The whole is heated within thirty minutes to 115° C. and dyeing is carried on at this temperature for one hour. A bluish claret dyeing of very great levelness and fastness is obtained.

The dye liquor exhibits practically no foam formation during the dyeing.

EXAMPLE 15

1 part of the sodium salt of the monoglycerol ether of p-dodecylphenol-2-sulfonic acid, 1 part of the adduct of 10 moles of ethylene oxide to laurylamine and 1 part of the stearic acid bisester of the adduct of 25 moles of ethylene oxide to a polypropylene glycol having a molecular weight of 2500, the whole being stirred with 5 parts of water to form a stable mixture clearly soluble in water prior to the addition of this auxiliary, are added to 2000 parts of water at 60° C. in a high temperature winch dyeing machine. 0.4 part of sodium acetate and 0.6 part of 30% acetic acid are then added to the liquor.

100 parts of knitted goods of textured nylon 6 fiber yarn is introduced into the liquor and the material is moved by rotation of the winch. The whole is heated within twenty minutes to boiling temperature and kept for ten minutes at this temperature. 1 part of the 1:2 cobalt complex dye of C.I. 15,707 is then added as quickly as possible, the whole is heated to 115° C. and dyeing is continued for one hour at this temperature.

A dark olive material is obtained of very great levelness and fastness.

EXAMPLE 16

1 part of the sodium salt of the reaction product of styrene oxide with p-dodecylphenol-2-sulfonic acid, 0.5 part of 30% acetic acid and 0.5 part of sodium acetate are added to 1000 parts of water. 100 parts of skeins of yarn of textured nylon 6,6 are placed within a cotton net package and placed for ten minutes at 50° C. in the said liquor; then the dye specified in Example 2 is added and the whole heated in forty-five minutes to boiling temperature and dyed for one hour at this temperature.

A fast and level bright red dyeing is obtained.

We claim:

1. A compound of the formula

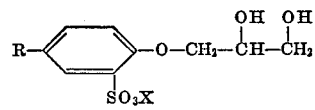

in which R is alkyl of 8 to 14 carbon atoms and X is hydrogen, alkali metal, ammonium or substituted ammonium.

2.

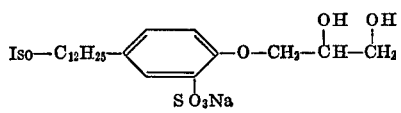

3.

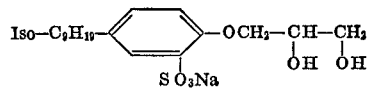

4.

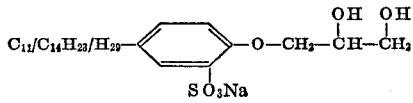

5. A process for the production of a compound of the formula

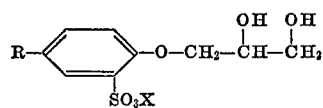

in which R is alkyl of 8 to 14 carbon atoms and X is hydrogen, alkali metal, ammonium or substituted ammonium, which process comprises reacting at least one compound of the formula

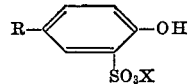

wherein R and X have the above meaning, with epichlorohydrin in an aqueous alkaline medium in which the alkaline agent is alkali hydroxide, ammonia or an amine, with the proviso that the reaction product is neutralized with acid to change X to hydrogen.

References Cited
UNITED STATES PATENTS

| | | | |
|---|---|---|---|
| 2,178,829 | 11/1939 | Bruson et al. | 260—512 R |
| 2,184,935 | 12/1939 | Bruson et al. | 260—512 R |
| 3,004,006 | 10/1961 | King et al. | 260—512 R |
| 2,694,087 | 11/1954 | Petrie et al. | 260—512 R |

DANIEL D. HORWITZ, Primary Examiner

U.S. Cl. X.R.

8—55, 89

UNITED STATES PATENT OFFICE
CERTIFICATE OF CORRECTION

PATENT NO. : 3,809,717
DATED : May 7, 1974
INVENTOR(S) : Manfred Daeuble et al.

It is certified that error appears in the above-identified patent and that said Letters Patent are hereby corrected as shown below:

In Column 1, after Line 7, insert "Claims priority, application Germany, April 5, 1971, P 21 16 560.6"

Signed and Sealed this twenty-second Day of June 1976

[SEAL]

Attest:

RUTH C. MASON
Attesting Officer

C. MARSHALL DANN
Commissioner of Patents and Trademarks